United States Patent
Willis et al.

(10) Patent No.: US 8,571,421 B2
(45) Date of Patent: Oct. 29, 2013

(54) HIGHLY TUNABLE, LOW JITTER OPTICAL CLOCK GENERATION

(75) Inventors: John C. Willis, Rochester, MN (US); Ruth A. Betcher, Rochester, MN (US)

(73) Assignee: FTL Systems, Inc., Rochester, MN (US)

( * ) Notice: Subject to any disclaimer, the term of this patent is extended or adjusted under 35 U.S.C. 154(b) by 537 days.

(21) Appl. No.: 12/679,259

(22) PCT Filed: Sep. 22, 2008

(86) PCT No.: PCT/US2008/077226
§ 371 (c)(1),
(2), (4) Date: Mar. 19, 2010

(87) PCT Pub. No.: WO2009/039496
PCT Pub. Date: Mar. 26, 2009

(65) Prior Publication Data
US 2010/0232811 A1    Sep. 16, 2010

Related U.S. Application Data

(60) Provisional application No. 60/973,959, filed on Sep. 20, 2007.

(51) Int. Cl.
*H04B 10/04* (2011.01)

(52) U.S. Cl.
USPC .......................................... 398/201; 398/182

(58) Field of Classification Search
USPC ................................................. 398/182, 201
See application file for complete search history.

(56) References Cited

U.S. PATENT DOCUMENTS

| | | | |
|---|---|---|---|
| 5,708,671 A | 1/1998 | Siao et al. | |
| 5,907,295 A * | 5/1999 | Lin | 341/61 |
| 7,142,789 B1 * | 11/2006 | Weiner et al. | 398/201 |
| 2001/0053008 A1 * | 12/2001 | Ueno | 359/158 |
| 2003/0058495 A1 | 3/2003 | Brindel | |
| 2004/0184819 A1 | 9/2004 | Vassilieva et al. | |

(Continued)

FOREIGN PATENT DOCUMENTS

WO    WO/2008/002622    3/2008

OTHER PUBLICATIONS

Delfyett, P.J., et al. "Optical frequency combs from semiconductor lasers and applications in ultrawideband signal processing and communications" J. Lightwave Technology, vol. 24, Issue 7, pp. 2701-2719, Digital Object Identifier 10.1109/JLT.2006.875948, Jul. 2006.

(Continued)

*Primary Examiner* — Nathan Curs
(74) *Attorney, Agent, or Firm* — Ojanen Law Offices; Karuna Ojanen

(57) ABSTRACT

An apparatus is disclosed for the optical generation of clock signals with tunable frequency and low jitter. A laser source serves as both the carrier used to transmit the clock signal for use by other optical, electronic or hybrid circuit elements and the original modulation time base. A fraction of the original laser source undergoes one or more stages of frequency division before being recombined as a modulation signal with the remaining laser beam. Transmission of the resulting signal via single mode fiber and dividers retains the low jitter properties of the modulated signal. By starting with a clock signal of optical frequency then dividing downward in frequency, comparatively high frequency clocks may be generated, notably in the GigaHertz and TeraHertz frequency ranges.

16 Claims, 7 Drawing Sheets

(56) References Cited

U.S. PATENT DOCUMENTS

| | | | | |
|---|---|---|---|---|
| 2004/0190907 | A1* | 9/2004 | Litvin | 398/149 |
| 2004/0253000 | A1* | 12/2004 | Grifin | 398/183 |
| 2006/0018668 | A1 | 1/2006 | Xu | |
| 2006/0056854 | A1* | 3/2006 | Hu et al. | 398/155 |
| 2006/0215175 | A1 | 9/2006 | Yacoubian | |
| 2008/0129343 | A1* | 6/2008 | Kenney et al. | 327/12 |

OTHER PUBLICATIONS

Zhi Jiang, et al. "Optical arbitrary waveform generation and characterization using spectral line-by-line control" J. Lightwave Technology, vol. 24, Issue 7, pp. 2487-2494, Digital Object Identifier 10.1109/JLT.2006.874661, Jul. 2006.

Leven, A., et al. "An InP-based OEIC for optical arbitrary waveform generation" Compound Semiconductor Integrated Circuit Symposium, 2005. CSIC '05. IEEE, pp. 299-301, Digital Object Identifier 10.1109/ CSICS.2005.1576601, Nov. 2005.

Kai-Hsiu Liao et al. "A programmable on-chip ultrashort-pulse shaper using a micromachined actuator array and a chirped fiber Bragg grating" Conference on Lasers and Electro-Optics, 2005. (CLEO), vol. 3, 2253-2255, May 2005.

Lin, I.S., et al. "Microwave arbitrary waveform generation via open-loop, reflective geometry Fourier transform pulse shaper" Lasers and Electro-Optics, 2004. (CLEO). Conference on Lasers and Electro-Optics (CLEo), vol. 1, pp. May 2004.

Weiner, A.M., et al. "Ultrafast Optics Techniques for Microwave/Millimeter-Wave Arbitrary Waveform Generation" IEEE pp. 1011-1012, 2003.

Devgan, P., et al. "Ultra-low-jitter multiwavelength synchronized opti-cal pulse source for C-, L-, and U-bands," in Electronics Letters, vol. 39 No. 18 , Sep. 4, 2003.

McKinney, J.D., et al. "Photonically assisted generation of continuous arbitrary millimetre electromagnetic waveforms", Holey Fibers and Photonic Crystals/Polarization Mode Dispersion/Photonics Time/Frequency Measurement and Control, 2003 Digest of the LEOS Summer Topical Meetings, Electronic Letters, vol. 39, No. 3, pp. 309-311 Feb. 6, 2003.

Weiner, A.M. "Electromagnetic arbitrary waveform generation via down-conversion of shaped femtosecond pulses" Lasers and Electro-Optics Society, 2002. LEOS 2002. The 15th Annual Meeting of the IEEE vol. 2, pp. 584-585, Nov. 2002.

Bennett, C.V. and Kolner, B.H. "Subpicosecond Single-Shot Waveform Measurement using Tem-poral Imaging", Lasers and Electro-Optics Society (LEOS) 1999, vol. 2, pp. 888-989, 1999.

Scott, Ryan Patrick "Design and Applications of Resonant Electro-Optic Time Lenses", MS The-sis, EE Department, University of California, 1995.

Miyamoto, D., Mandai, K., Tsuda, H., Aizawa, K., and Kurokawa, T. "Aritrarry Waveform Optical Pulse Generation Using an Optical Pulse Synthesizer", 2005.

Godil, Asif A. et al. "Picosecond Time-Lenses", IEEE J. of Quantum Electronics, vol. 30, No. 3, pp. 827-837. Mar. 1994.

* cited by examiner

HIGHLY TUNABLE, LOW JITTER OPTICAL CLOCK GENERATION

The U.S. Government has a paid up license in this invention and the right in limited circumstances to require the patent owner to license others on reasonable terms as provided for by the terms of contract N00014-08-C-0072 awarded by the U.S. Office of Naval Research.

FIELD OF THE INVENTION

Clock circuits supply a periodic waveform. The periodic waveform usually approximates a square wave, trapezoidal wave or sine wave resulting from frequency limitations of the generation and transmission circuit. In many electronic and optical generation and transmission systems, the periodic waveform amplitude-modulates a much higher frequency periodic waveform known as the carrier. For example, an optical carrier with a 1510 nm wavelength or approximately 200 TeraHertz may be amplitude-modulated by a periodic waveform at 10 GigaHertz. Simple periodic waveforms communicate a timing signal used to synchronize a multiplicity of receiving circuits, as in a computer system. More complex periodic waveforms may encode information to provide data communication on one or more channels. Examples of such information include voice, video or computer files communicated from one location to another.

Variations in the periodicity of waveforms, known as jitter, reduce the efficiency of systems using the timing or communications signal. In order to accommodate variations in the periodicity of a timing signal, receiving circuits using the timing signal for synchronization must be designed to function as intended for a range of periodicities corresponding to the shortest through the longest periodicity that may result from jitter of the original periodic waveform. In order to accommodate such a range, less work is typically done during each period by components utilizing the clock signal, usually resulting in a less efficient system. In order to accommodate variations in the periodicity of a communications signal the period must typically be lengthened, thus reducing the data transfer rate, usually resulting in a less efficient transmission system. Therefore reduction in jitter has value by utility time-synchronized and communications systems more efficient.

Carrier frequencies and modulation frequencies are almost always derived from distinct physical processes, such as resonance of a cavity or other structure. Any such physically realizable process has slight variations in frequency over time, often known as drift. Examples of physical processes leading to drift include changes in temperature, pressure and aging. When carrier and modulation frequencies result from independent physical processes, drift will occur at different rates and potentially even in different directions. Such changes induce jitter as the carrier and modulation waveform are mixed with varying phase differences. For example at one point the rising edge of the modulation waveform adds to the rising carrier amplitude, at another time it subtracts, resulting in comparatively small differences, in the periodicity of the clock. As the carrier and modulation frequency approach each other or the carrier and modulation amplitude approach each other the resulting jitter will increase.

Clock period and synchronicity can vary with both distance from the clock generator and on distinct pathways based on finite and often differing transmission bandwidth characteristics. This is known as time-varying skew and can decrease system efficiency. Optical transmission systems generally have higher bandwidth than electronic transmission systems. Systems which limit propagation to a single mode within the optical transmission system have inherently lower variation than those which allow multiple modes. At the point of use, optical clock signals may be converted into electronic signals where required, although with increased jitter and skew. An embodiment disclosed herein may be practiced with an all-electronic implementation, another embodiment utilizes an all-optical, single mode, fiber design.

In many systems it is useful to vary the clock period under external control, known as clock tuning. Examples of clock tuning include tuning the period of a local oscillator which determines the frequency at which a wireless system transmits and/or receives or the clock used by different speed grades of a computer's processor. As clocks increase in frequency from tens of MegaHertz into the TeraHertz range, tuning ranges typically become more restricted, resulting in a more limited range of periods which can be externally controlled. Such limitations in the clock period which can be attained through tuning limit the utility of a clock system.

The present disclosure teaches an apparatus for and method of generating optical clocks which are highly tunable and exhibit low jitter when used with timing and/or communication systems. The apparatus and methods disclosed retain tuning and jitter properties even with short periods or correspondingly high frequencies, resulting in an invention which has significant utility across a wide range of timing and communication applications.

BRIEF SUMMARY OF THE INVENTION

The disclosure herein presents: (1) a source of continuous wave laser emissions with narrow optical bandwidth [FIG. 1; Block 1]; (2) a method and apparatus for optically splitting the laser emission into a carrier and one or more beams to be modulated [Fig 1: Block 2]; (3) one or more digitally controlled time-lens capable of dividing the laser emission frequency down to a modulation frequency [Fig 1; Block 3]; (4) one or more optically controlled, optical modulators [Fig 1; Block 4]. In order to facilitate planar, monolithic implementations of the time-lens [3] and modulator [4], the laser timebase may include a means of restricting the laser emission to a specific plane of polarization. The disclosure offers a digitally controlled signal which can be used for time synchronization and/or data transmission exhibiting low jitter. The clock signal may be transmitted via optical fiber through conventional optical dividers. At each point of use the optical signal may be converted into an electronic signal via a diode or other means to convert optical into electronic signals.

DESCRIPTION OF THE PREFERRED EMBODIMENT

Figure 2:
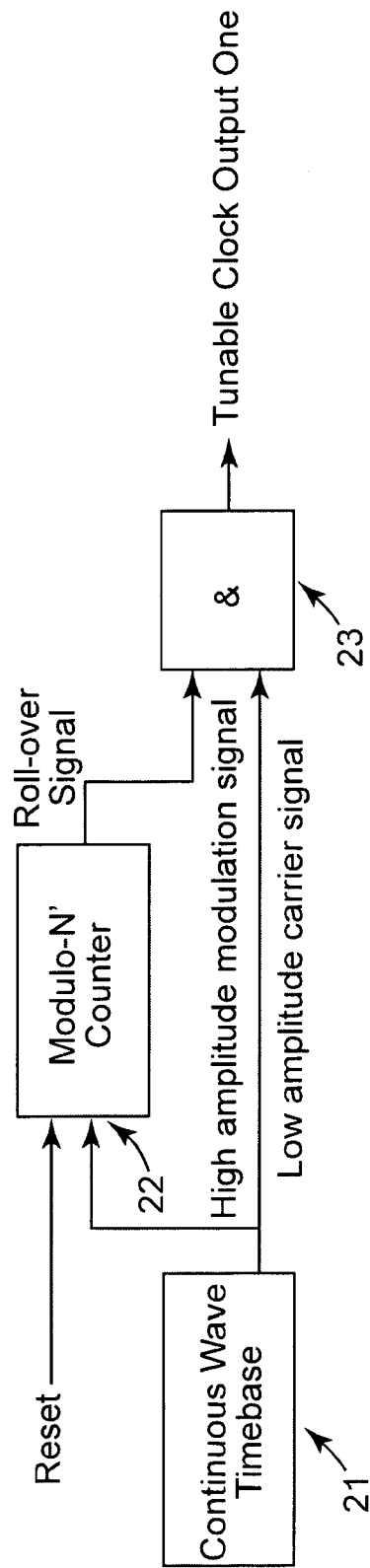
FIG. 2: Logical behavioral model.

An optical embodiment of generating a highly tunable low jitter optical clock may be most rapidly understood by starting with an abstract digital model (FIG. 2). A continuous wave timebase [Block 21] drives a logical AND (denoted per IEEE standards with &) gate [Block 23] both directly and through a modulo-N counter [Block 22]. The resulting clock output has a period which is 2 * N times the period of the continuous wave time base.

The AND gate in this model [Block 23] is not actually a Boolean AND gate. When the modulation signal is logic low, the low amplitude carrier signal passes through the AND gate at a low amplitude. When the modulation signal from the Modulo-N counter is high (second half of the count range), the carrier signal is greatly amplified but retains the same carrier frequency. When the clock signal is received, the carrier frequency must be "averaged out", yielding a conventional square wave clock at an output frequency much lower than the carrier frequency. Transmitting such a modulated carrier avoids circuit problems associated with transmitting signals varying slowly or not all.

By adjusting N used in the Modulo-N counter [Block 22], a wide (but discrete) range of output frequencies may be obtained. For effective operation the continuous wave timebase must operate at many times the desired output frequency, therefore N is typically larger (perhaps 2,048) but need not be a binary multiple. Logic design techniques for implementing Modulo-N counters are known in logic design. As the output frequency approaches the time-base frequency the granularity of tunable frequency steps increase. Even at high N factors the frequency steps are never completely uniform.

Figure 3:
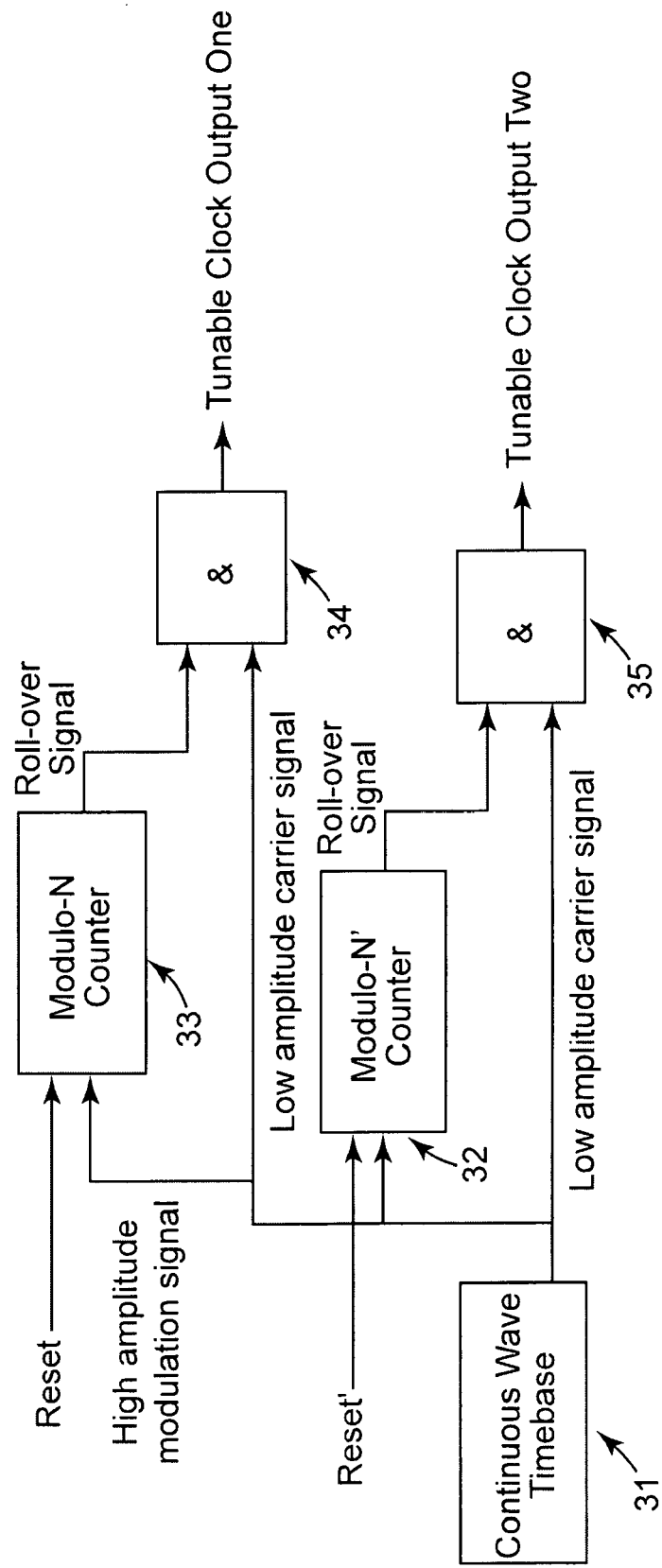
FIG. 3: Multiple clocks referenced to the same physical process.

Before leaving the digital logic behavioral model, it is useful to point out that the logic of FIG. 2 readily extends to multiple clocks at different frequencies but referenced to the same time-base, as shown in FIG. 3. Furthermore the clocks may be reset at different times (reset and reset' signals) to create the phase skew commonly associated with multi-phase clocks.

In order to achieve high output frequencies (1 GigaHertz into the TeraHertz range) in order to take advantage of the low RMS jitter/frequency associated with select solid state laser carrier frequencies and to drive high-fanout over long distances, a continuous-wave laser is an effective time-base. Such lasers are commonly available with carrier frequencies of several hundred TeraHertz. A typical laser mass-produced for communication along single mode fibers has a frequency of approximately 192 TeraHertz or a wavelength of 1550 nanometers.

Unfortunately carrier frequencies around 200 TeraHertz completely preclude use of any known digital logic or optical to electronic conversion. The fastest digital electronics' logic families or detector/amplifier circuits currently contemplated using superconducting electronics operate below 1 TeraHertz. Therefore the Modulo-N functionality and AND gate (really a modulator) must be implemented optically. The methods and apparatus disclosed herein implement the above behavioral model using commercially realizable technology.

Figure 1:
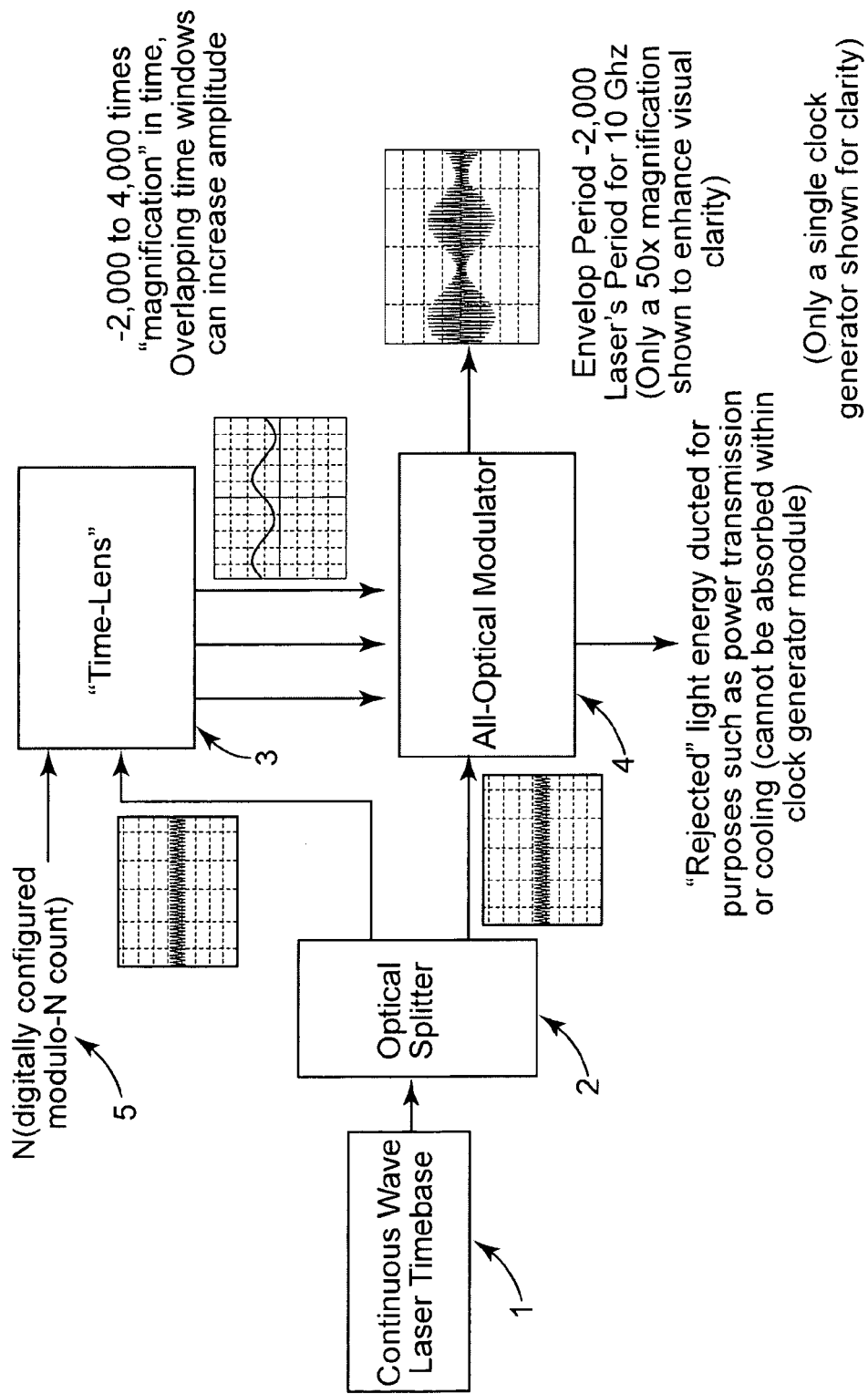
FIG. 1: Optical clock generator block diagram.

With the high level digital model previously introduced in mind, it is useful to evolve the Modulo-N counter and the AND gate (really modulator or mixer) into an optical implementation, as shown in FIG. 1. Such an all-optical implementation of the clock generator enables practical realization of clocks with much higher bandwidths (multiple TeraHertz) than would be feasible with digital electronics (tens of GigaHertz).

Figure 4:
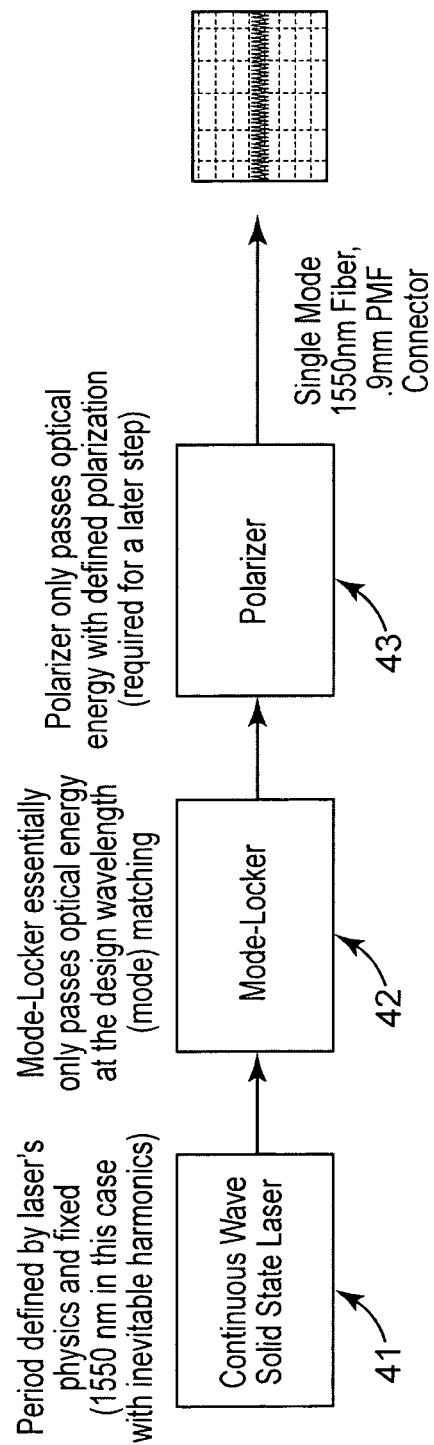
FIG. 4: Continuous wave laser timebase.

The continuous wave time-base shown in FIG. 2. and FIG. 3. is implemented by a continuous wave laser timebase [Block 1, detailed in FIG. 4]. Output of the continuous wave laser must be split using one of the optical splitter technologies commonly used in the optics and telecommunications industry and commercially available. Functionality of the modulo-N counter above may be implemented using "time-lens" techniques [Block 3] while the AND gate may be implemented using an all-optical modulator [Block 4]. Timing-varying digital configuration [Block 5] of the modulo-N counter enables clock frequency, phase control for time applications and data input for communications applications. Scope waveforms insets in FIG. 1. help the reader to visualize the waveforms present at each interface in the clock generator system.

FIG. 4. provides detail of the continuous wave laser timebase (FIG. 1. Block 1). The timebase consists of the laser itself [Block 41], a mode-locker [Block 42] and an optional Polarizer [Block 43]. Assembling and aligning these components are known in the field of optical system fabrication. In particular, the order of polarization and mode-locking may be inverted in some assembly situations. Depending on the laser, the polarizing or mode-locking functionality may be absorbed into the laser design [Block 41]. If a three-dimensional polarizer is used, polarization may not need to be constrained.

Solid-state, continuous-wave lasers [Block 41] are readily available in commercial packaging with specific frequencies throughout the ultravioulent, visible and infrared bands (~400 nm through ~1600 nm) and at widely varying intensities suitable for achieving most fan-out requirements without amplifications. Alternatively, optical amplifiers may be inserted at the output of the optical clock generator or within the subsequent distribution network using techniques familiar to the design of long distance optical fiber transmission systems. Such amplifiers usually insert additional jitter.

The time-lens and all-optical modulator must be designed for a specific laser wavelength (or limited range of wavelengths), however with adoption of the time-lens and modulator design, a wide range of fixed-frequency lasers may be used. Lasers vary widely in their short-term frequency and amplitude stability. Averaging several hundred cycles of a laser's period within the time lens reduces short term frequency and amplitude variations in the modulation signal.

Since resonators inside all lasers emit radiation at a range of frequencies (both through short term frequency instabilities and harmonics), a wavelength locking device is essential if not already incorporated in the laser design [Block 42]. Such commercial devices, often in the form of a Etalon or Fabry-Perot interferometer, sample and feedback, resulting in transmission restricted to wavelengths of a very narrow wavelength range desired.

Inserting some means of restricting polarization of the laser beam [Block 43] enables a planar, integrated optical implementation of the time-lens [Block 3] and simpler planar, integrated all-optical modulator [Block 4]. Various means of restricting polarization are commercially available. Connections within the optical clock generator must then remain correctly oriented to insure that re-convergent optical paths maintain the right polarization relationship. Connectors suitable for maintaining the required polarization are available using commonly available industry mechanics.

The time-lens, as utilized in this application, derives a lower-frequency modulation frequency by "stretching" the original laser's wavelength, then averaging many periods of the stretched waveform. This stretching and averaging yields a more stable and lower frequency signal at the desired modulation output clock frequency. The degree of stretch may be dynamically varied to control timing clock frequency or insert data for communications transmission. This lower frequency signal then serves to modulate the original laser carrier. Since the original carrier and modulation signal have a fixed or one of several predictable phase relationships, a source of jitter which would otherwise occur if the modulation signal was derived independent of the carrier is avoided for suitable choices of the time lens configuration [FIG. 5, FIG. 6. and FIG. 7].

Figure 7:
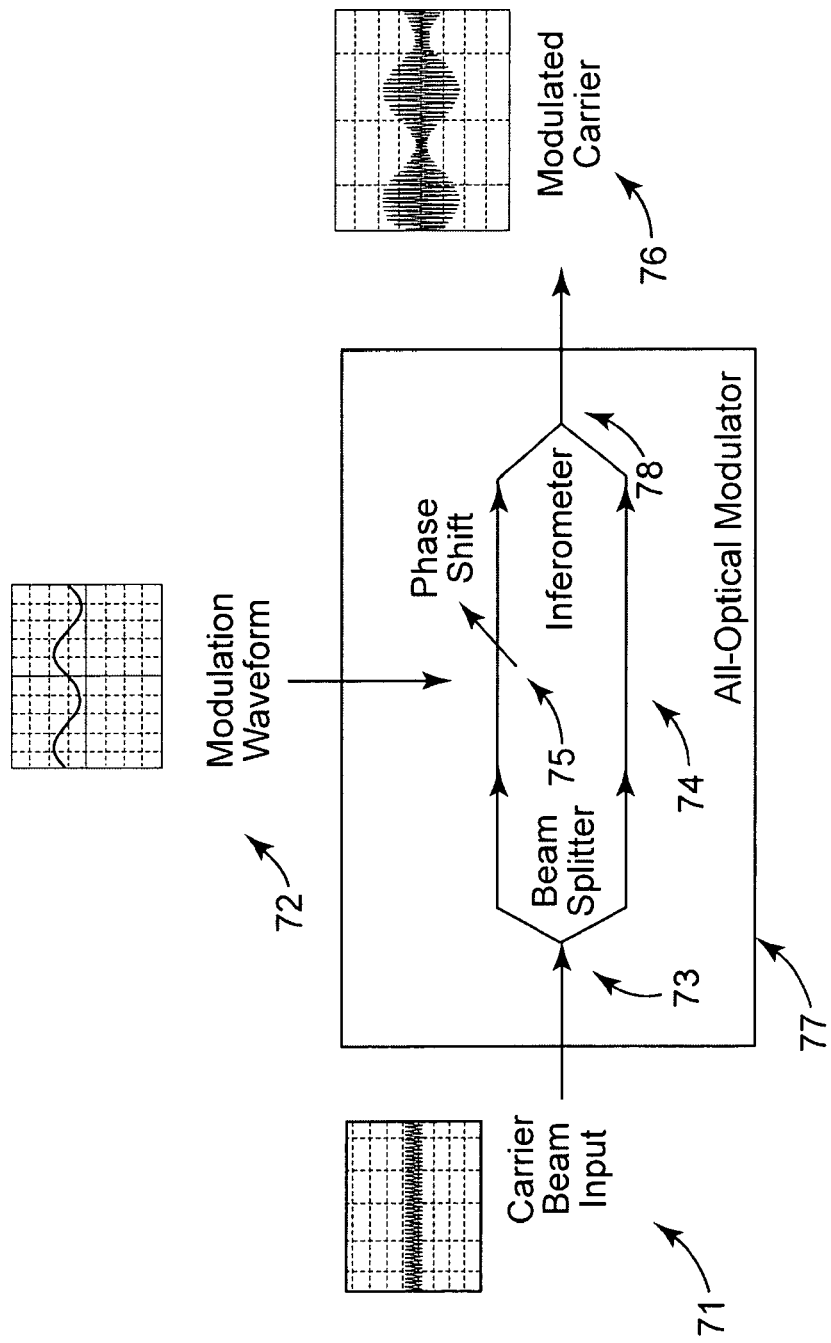
FIG. 7: Optically-controlled, optical modulator.

The all-optical modulator, shown in FIG. 7, divides the carrier beam above into two distinct beams [73], modulates the phase of one otherwise equivalent length path [75] then recombines the beams [78] so as to create interference proportional to the phase modulation and thereby modulate the carrier's amplitude. Various techniques for fabricating such modulators are commercially available or may be fabricating using various techniques reported in the literature. Critically, the overall operation of the interferometer does not modify phase of the outgoing carrier; phase modulation is an internal process used to achieve amplitude modulation. Other known architectures for optically controlled, optical modulation may be adapted for use.

Contemporary technology commonly modulates optical beams traversing a channel or waveguide using an electric field. The simplest approach uses the Pockels effect (devices are called Pockels Cells). These cells generating a change in a channel's (optical) refractive index proportional to the amplitude of the induced electronic field. When an essentially single-frequency optical beam traverses the channel, the change in refractive index slightly increases or decreases the propagation time through the channel and thus the phase when original and phase shifted beams are recombined. The Quadratic Electro-Optic (QEO) or Kerr effect likewise modulates a channel proportional to the square of the electronic field induced on the channel. Such electronic gating signals are convenient if the modulating signal is already electronic, however as the modulation frequency increases from GigaHertz to TeraHertz, electronic modulation becomes increasingly less practical.

The Optical Kerr or AC Kerr effect is of particular interest as the gating frequency goes from GigaHertz to TeraHertz (beyond practical electronics). Using the Optical Kerr effect, changes in the refractive index are induced nonlinearly in proportional to localized optical intensity of a gating optical beam (via an electrical field locally induced within the channel/waveguide material by the optical beam). This is the pure-optical analog of an electrical engineer's transistor wherein the flow of electrons (voltage or current) at a gate controls the flow of electronics through a channel (such as source to drain). In the case of this application's clock or a digital system's transistor, non-linear control to channel relationships can be made beneficial by insuring that a modest energy control signal switches a high energy in the main clock signal beam. This allows the modulation signal to be derived in a lossey process from a common CW laser beam via the time-lens mechanism described earlier.

Implementation of the Optical Kerr effect via nanoelectronics lithographic processes has already been reported by several researchers over the last twenty years. For example, a Caltech/University of Washington collaboration demonstrated an implementation using a silicon-polymer waveguide construction [Nature Materials, 2006, 703-709]. Their silicon implementation used free-carriers to demonstrate operation at 10 GHz. While the introduction of polymers enabled use of silicon, the deviation from conventional foundry materials currently requires special processing steps.

It is useful to initially switch significant clock signal energy. Diodes which may be employed for optical to electronic conversion integrate the ~200 TeraHertz carrier and extract the modulated clock envelope, require that the input signal energy/power fall within a range of perhaps 100 microWatt to 10 milliWatt (depending on the diode and subsequent trans-impedance amplifier or TIA). If the originating clock signal is divided many times to achieve fan-out, the modulator must either handle significant power or the clock signal must be amplified, such as a traveling wave element. Such an amplifier both increases cost and increases jitter/skew. It is useful to modulate the required power in the original modulator to the maximum extent feasible (sometimes amplifiers are required to meet fanout requirements).

The AC Kerr effect depends on the second-order non-linear refractive index of the channel material. While material-dependent, it is comparatively small, on the order of 10-20 $m^2$/Watt. This requires both high input intensities and a narrow channel (otherwise constrained in this case by the requirement for single-mode propagation). A sequence of AC Kerr cells may be arranged in series to increase aggregate modulation levels.

Optical to optical modulation requires significant optical modulation energy. Many time lens approaches are comparatively inefficient, yielding only enough optical energy to modulate a high bandwidth photo-detecting diode. To avoid further amplification of the modulation signal, for purposes of clock generation watts rather than nanoWatts are required.

Figure 6:
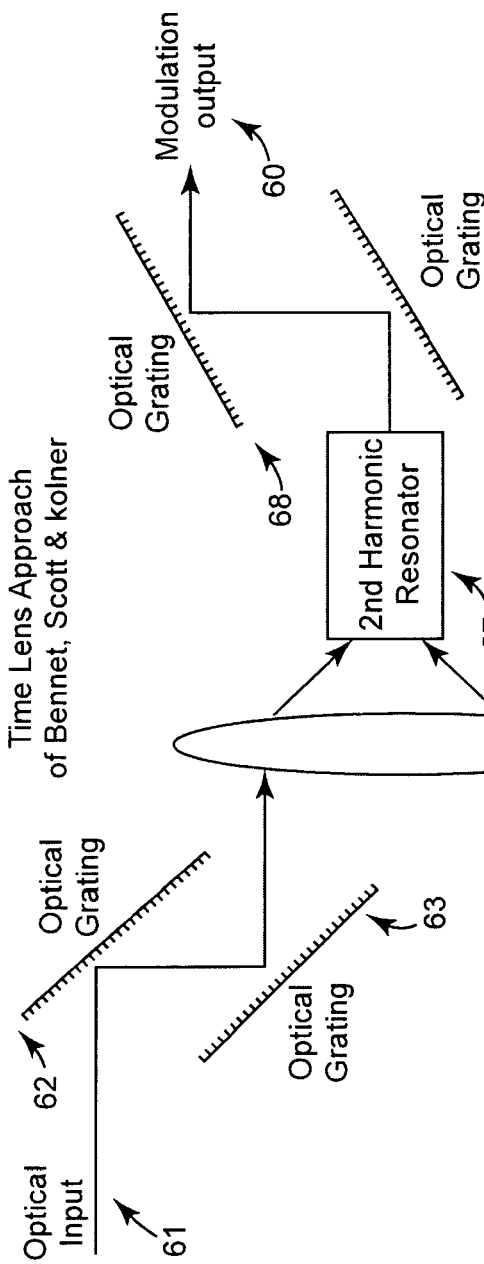
FIG. 6: Prior art approach to time-lens.

Time-lens [Block 3, a single stage detailed in FIG. 6] are uniquely used in this work to derive an optical clock modulation signal directly from a carrier frequency of the laser beam. In prior-art, variations of the time-lens have been employed, to examine ultra-fast optical signals by expanding an arbitrary optical waveform in time sufficiently that it can be detected and recorded by conventional electronic transient recorders or oscilloscopes.

Figure 5:
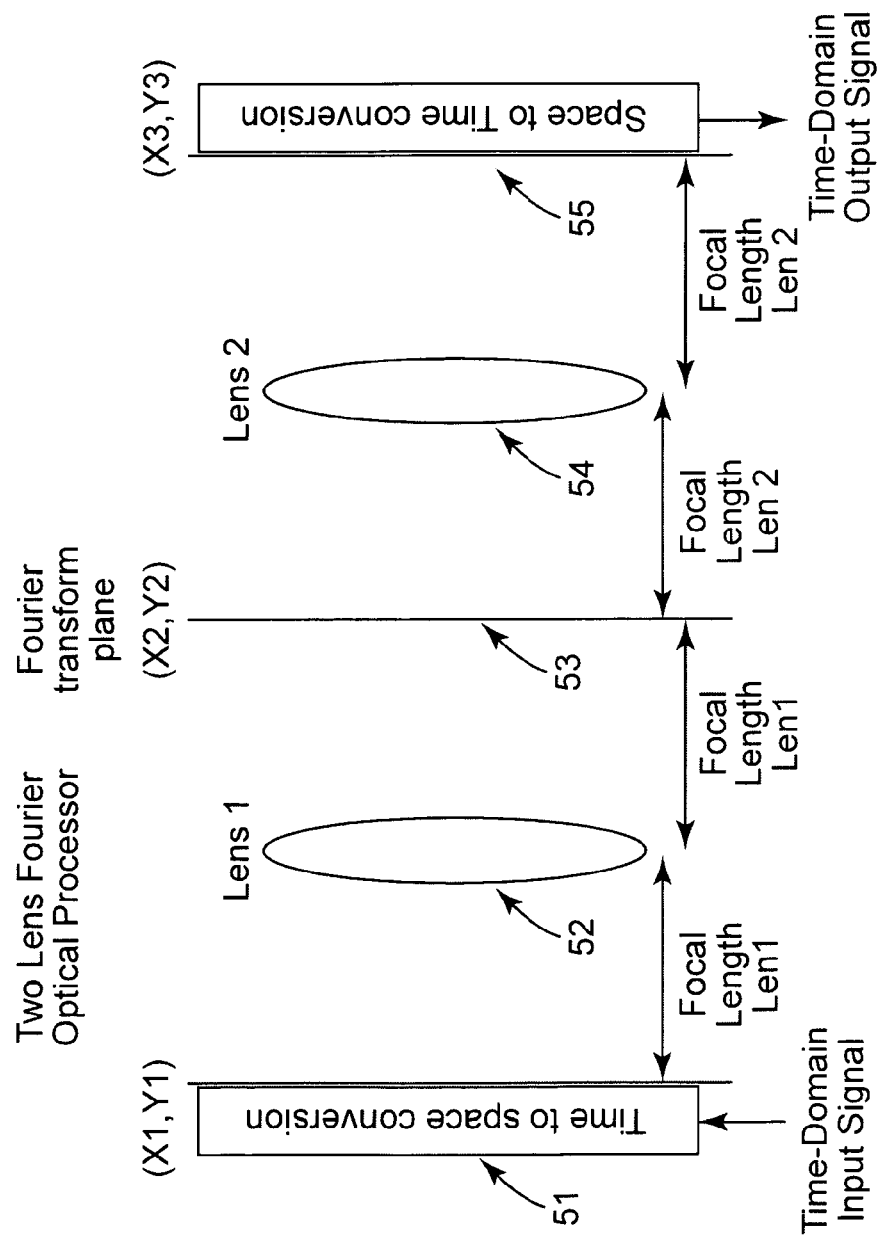
FIG. 5: Classical two-lens Fourier optical processor.

An implementation of a time lens is shown in FIG. 5 in side view. An input waveform is converted from a sequence of values in time into a continuously evolving spatial signal. For electronic Signals, 20 Bragg cells are the classical time to space transduction device. Lens 1 in a classical two lens Fourier optical process produces the two-dimensional, spatial Fourier transform of the (X1,Y1) input plane on the (X2,Y2) input plane. Lens 2 then takes the inverse Fourier transform from the (X2,Y2) plane to the (X3, Y3) plane.

Prior to the advent of modern digital signal processing, a wide variety of spatial filters (low pass, high pass, edge detection, . . . ) were interposed at the (X2,Y2) plane. Alternatively an additional lens may be interpose following the (X2,Y2) plane to scale spatial frequencies (up or down) before taking the inverse transform. When the (X1,Y1) plane represents a periodic waveform, such as the laser's carrier frequency, scaling thus can form a clock waveform that is slower (or for other reasons faster) than the original frequency spectra; the input has been up-converter or down-converted. The (X3,Y3) spatial waveform can then be converted from space to time coordinates, in this case resulting in the slower modulation waveform.

Unlike the electrical to optical conversion provided by a Bragg cell, which is significantly frequency-limited and expensive, conversion of time to space and space to time entirely within the optical domain is comparatively simple, inexpensive and can impose comparatively little bandwidth reduction. Most techniques utilize some form of optical grating.

The time lens shown in FIG. 5 has several significant limitations in general and specifically for the optical clock generation application. These limitations include scaling limitations, finite component bandwidth, transmission properties of lens at many non-visible wavelengths (such as 1550 nm), modulation output power required and rigid physical control over focal length, axial positioning and planarity.

It would be infeasible to achieve scaling factors which would convert a nominal 200 TeraHertz waveform into a nominal 1 to 100 GHz modulation waveform; scaling factors are typically 100× or lower. This problem can be addressed through use of two or more stages. For example dividing by 50× in the first stage and 50× in the second stage. Each stage replicates the functionality such as that shown in FIG. 6.

Even optical components have finite maximum and minimum bandwidth. A realizable time lens tunable from GigaHertz to TeraHertz must insure that all components in the circuit have sufficient bandwidth and signal to noise ratio. This effectively excludes many otherwise viable components. Many optical fiber components including some semiconductor lasers, fibers and other components work at frequencies outside the normally visible spectrum, in this case at 1550 nm, a long or infrared wavelength. Mirrors, lens and gratings are available with effective, characterized properties in the infrared, however not all such devices are effective at such frequencies. Finally, the time lens construction requires rigid control over the actual focal lengths (controlling the frequency scaling), axial positions and planarity despite differential thermal expansion or mechanical forces on components with distinct mass.

Time lens have been built and demonstrated in the laboratory using discrete lens, gratings and other components, such as the realizable implementation reported by Bennett, Scott and Kolner and shown in FIG. 6. However an embodiment disclosed herein takes advantage of the correspondence between the optical wavelengths involved (1550 nm at ~200 TeraHertz to several mm at 100 GigaHertz) and the feature/die sizes of modern opto-electronic components (100 nm to 150 nm features on die several mm across). Furthermore techniques are known for fabricating optical waveguides, optical gratings and micro-electronic machines on GaAs (easier to implement modulators and high frequency control), such as work by INRIA researchers using Ohmmic GaAs processes, or even Si-based approaches.

A more compact and stable time-lens may be fabricated using one or more electronic, optical or electronic circuits containing elements which perform an optical functionality equivalent to that shown in FIG. 6. Furthermore, polarizing the laser beam enables an implementation of the time lens using established, lithographic opto-electronic and micro-electronic machine structures (MEMS). The pre-computed chirp [Block 65] feeding the electronic to optical converter may be replaced by a real-time data input for data transmission or a pre-computed chirp waveform intended to generate a specific clock signal. With sufficient integration available, a multiplicity time-lens [3] and modulator [4] may be combined with the logic formatting, encoding or even generating data for transmission.

Relative spacing of the left and right grating pairs [62, 63, 68 and 69] as well as the relative (left and right) group velocity dispersion and the electronic waveform sent to the electronic to optical converter [65] determine the ratio between input and output frequency. On a monolithic integrated circuit implementation it is easier to electronically vary the group velocity dispersion under digital control than the grating spacing (accordingly these velocities are used for frequency tuning).

Phase modulation equivalent to the lens shown in FIG. 6 can be implemented using an array of Mach-Zehnder modulators with discrete but varying phase (conceptually replacing the len's continuous Fourier transform with an optical discrete Fourier transform). We believe the harmonics introduced by the optical discrete Fourier transform are eventually filtered out by the limited bandwidth of the optical to electrical converters at each point of use. Previous polarization (see FIG. 4) critically replaces a two dimensional optical Fourier transform with a one dimensional discrete optical Fourier transform. A variety of other, functionally equivalent time-lens implementations are evident to those skilled in the related arts.

A microcontroller may be incorporated to responds to external on/off, long-term amplitude adjustment and long term frequency adjustment commands by adjusting the laser's pump, time-lens configuration and chirp waveform stored within the time-lens chip. Critically, all signal electronic inputs and outputs to the entire clock generator can be satisfied by commonly available control connections such as USB or Ethernet. All high speed signals are single mode fiber optical connections. Unlike W-Band electronic connectors, which are delicate and potentially cost more than the entire clock generator module, suitable optical connectors are readily available at costs compatible with the mass-market broadband telecommunications industry throughout much of the world.

What is claimed:

1. An optical clock generator, comprising:
a coherent light source;
an energy splitter to receive output from the coherent light source;
a time lens to scale a frequency of the coherent light source received from the energy splitter;
an intensity modulator to receive output from the time lens and from the coherent light source to generate an optical clock signal derived from and in a phase relationship with the frequency of the coherent light source.

2. The optical clock generator of claim 1, further comprising:
the intensity modulator being optically controlled from the output of the time lens.

3. The optical clock generator of claim 1, further comprising:
a polarizer arranged between the coherent light source and the energy splitter thereby restricting the plane of polarization of the coherent light.

4. The optical clock generator of claim 3, further comprising:
the time lens and the intensity modulator integrated as a lithographic opto-electronic micro-electronic structure.

5. The optical clock generator of claim 1, wherein the coherent light source is a continuous wave laser.

6. The optical clock generator of claim 1, wherein a scaling factor of the time lens is digitally-controlled.

7. The optical clock generator of claim 2, wherein the intensity modulator is a Kerr cell.

8. The optical clock generator of claim 2, wherein the intensity modulator is a Mach-Zehnder modulator.

9. The optical clock generator of claim 1, wherein light energy not used to generate the optical clock is ducted for power transmission.

10. The optical clock generator of claim 1, wherein light energy not used to generate the optical clock is ducted for power cooling.

11. The optical clock generator of claim 1, further comprising:
a wavelength locking device arranged to receive the output of the coherent light source and to transmit a narrow wavelength range of light to the optical splitter.

12. A method to generate a clock signal, comprising:
receiving electromagnetic energy from an energy source;
deriving a lower-frequency modulation frequency from the electromagnetic energy;

recombining the lower-frequency modulation frequency with the electromagnetic energy to generate a clock signal have a phased relationship with the electromagnetic energy.

13. The method of claim 12, wherein the step of deriving a lower-frequency modulation frequency from the electromagnetic energy further comprises expanding the electromagnetic energy in time.

14. The method of claim 12, wherein:
the electromagnetic energy is optical energy, the energy source is a continuous wave coherent light source, and the clock signal is an optical clock signal.

15. The method of claim 14, further comprising:
polarizing the optical energy prior to deriving the lower-frequency modulation frequency.

16. The method of claim 12, further comprising:
narrowing a range of frequencies of the electromagnetic energy output from the energy source.

* * * * *